United States Patent [19]

Megahed et al.

[11] 4,009,056
[45] Feb. 22, 1977

[54] PRIMARY ALKALINE CELL HAVING A STABLE DIVALENT SILVER OXIDE DEPOLARIZER MIX

[75] Inventors: El Sayed Megahed; Carol Ruth Buelow, both of Madison; Patrick Joseph Spellman, Middleton, all of Wis.

[73] Assignee: ESB Incorporated, Philadelphia, Pa.

[22] Filed: Mar. 15, 1976

[21] Appl. No.: 666,655

[52] U.S. Cl. .............................. 429/126; 429/206; 429/229
[51] Int. Cl.² ........................................ H01M 6/06
[58] Field of Search .............. 136/107, 20, 137, 30, 136/102, 106

[56] References Cited
UNITED STATES PATENTS

| | | | |
|---|---|---|---|
| 3,853,623 | 12/1974 | Davis | 136/107 X |
| 3,920,478 | 11/1975 | Kozawa | 136/20 X |
| 3,925,102 | 12/1975 | Kozawa | 136/20 X |

*Primary Examiner*—Anthony Skapars
*Assistant Examiner*—C. F. LeFevour
*Attorney, Agent, or Firm*—Gilbert W. Rudman; Anthony J. Rossi; Gary V. Pack

[57] ABSTRACT

A primary alkaline cell having a stable divalent silver oxide depolarizer mix comprising a negative electrode (anode), a divalent silver oxide (AgO) depolarizer mix, a separator between said negative electrode and depolarizer mix, and an alkaline electrolyte. The surface of the depolarizer mix is treated with a mild reducing solution to form a reduced layer surrounding the mix, and the surface of the reduced layer adjacent to the separator is coated with a layer of silver. The reduced layer surrounding the depolarizer mix in combination with the layer of silver provides improved stability of the depolarizer mix in the alkaline electrolyte and a single voltage plateau during discharge of the cell. The primary alkaline cell is characterized by a maximum open circuit voltage of about 1.75 volts.

The silver layer on the surface of the reduced layer surrounding the depolarizer mix can be formed by treating the reduced layer with a strong reducing solution to form a substantially continuous and electrolyte permeable silver layer, or alternatively, the silver layer may be formed by placing a silver screen, expanded silver metal, perforated silver foil or porous silver powder layer on top of the reduced layer surrounding the depolarizer mix and adjacent to the separator. It is preferred that the layer of silver be substantially continuous and electrolyte permeable which may be accomplished by treating the reduced layer surrounding the mix with a strong reducing solution. When forming the layer of silver by treating the reduced layer with a strong reducing solution, it is preferred that the depolarizer mix surrounded by the reduced layer be consolidated in a cathode container prior to treating it with the strong reducing solution. The depolarizer mix may contain from about 50% by weight to about 100% by weight of divalent silver oxide based on the total silver oxide content and still provide a cell with a single voltage plateau discharge.

18 Claims, 1 Drawing Figure

U.S. Patent  Feb. 22, 1977  4,009,056
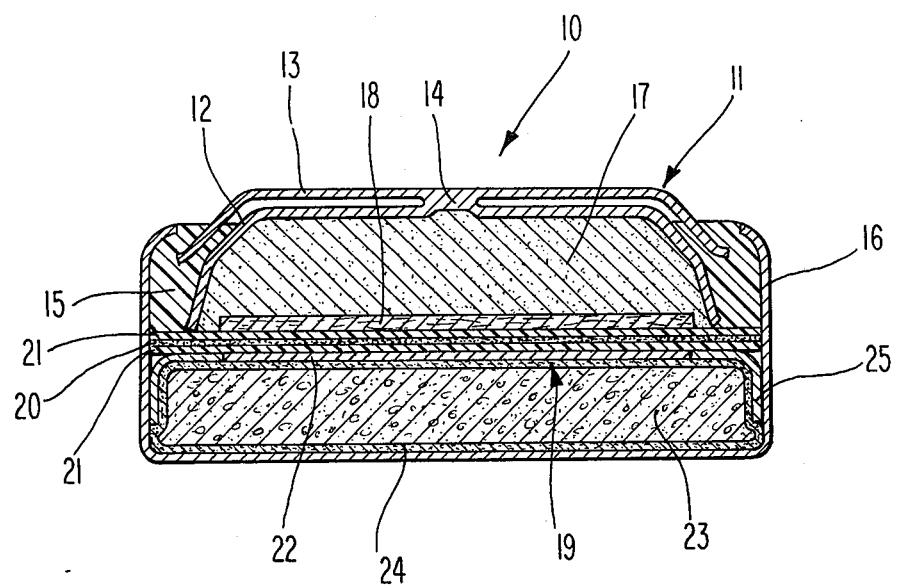

PRIMARY ALKALINE CELL HAVING A STABLE DIVALENT SILVER OXIDE DEPOLARIZER MIX

BACKGROUND OF THE INVENTION

In the packaged power industry, there is an ever increasing emphasis upon the development of high capacity, small volume electric cells. The following is a comparison of the capacity and voltage for some active materials currently used in commercially available cells:

| Active Material | EMF vs. Zn in Alkaline Electrolyte | Capacity ma-hr./g | Capacity amp-hr./cc |
|---|---|---|---|
| HgO | 1.35 v. | 248 | 2.76 |
| $Ag_2O$ | 1.60 v. | 232 | 1.76 |
| AgO | 1.82 v. | 432 | 3.22 |

Divalent silver oxide (AgO) is an excellent high capacity battery active material, but it has two properties which have limited its use as a battery active material. During the discharge of a battery employing a divalent silver oxide positive active material, the initial voltage is at the higher divalent voltage level (1.82v. vs. Zn in alkaline electrolyte) until substantially all of the AgO is converted to $Ag_2O$, and thereafter, the discharge continues at the lower monovalent voltage level (1.60v. vs. Zn in alkaline electrolyte). This two plateau voltage level during discharge cannot be tolerated by many types of battery operating equipment.

Another problem encountered when using divalent silver oxide as the depolarizer (positive active material) is its lack of stability when in contact with aqueous alkaline solutions. It is well known that divalent silver oxide evolves oxygen when in contact with aqueous alkaline solutions, and this gassing phenomenon causes self-discharge of the divalent silver oxide, converting it to monovalent silver oxide or metallic silver. Divalent silver oxide cannot be used as the positive active material in hermetically sealed cells because of this instability in alkaline solutions and the consequent hazard of pressure build-up and possible cell rupture.

The problem of the two plateau voltage level during the electrical discharge of divalent silver oxide has previously been overcome by the inventions disclosed in U.S. Pat. Nos. 3,615,858 and 3,655,450 issued to Luis Soto-Krebs. These patents disclose a battery having a positive electrode comprising a principal active material (e.g. divalent silver oxide) and a secondary active material (e.g. monovalent silver oxide) whose discharge product is readily oxidized by the principal active material in the presence of alkaline electrolyte, and wherein the sole electronic path of discharge of the principal active material is through the secondary active material. The battery invented by Soto-Krebs is characterized throughout discharge by the potential of the secondary active material ($Ag_2O$) vs. the negative electrode in the alkaline electrolyte. The battery has the advantage of a single voltage level during electrical discharge and also the increased capacity provided by the divalent silver oxide positive active material.

The problem of the divalent silver oxide instability has been overcome by the inventions disclosed in U.S. Pat. Nos. 3,476,610 and 3,484,295 issued to Luis Soto-Krebs and Robert Dawson. These patents disclose a battery having a positive electrode comprising a principal active material (e.g. divalent silver oxide) and a secondary active material (e.g. monovalent silver oxide) employed as a substantially electrolyte impermeable layer interposed between the principal active material and the battery components containing the electrolyte. This construction isolates the principal active material from contact with the electrolyte until the secondary active material is discharged, thereby providing improved stand or shelf life.

There are two patents which disclose methods for treating divalent silver oxide to provide alkaline batteries having a single voltage plateau during discharge. U.S. Pat. No. 3,055,964 issued to Frank Solomon and Kenneth Brown, discloses a process for treating an oxidized silver electrode containing argentic (divalent) and argentous (monovalent) silver oxide which comprises heating the electrode to at least 50° C., and preferably 50° to 300° C., for 0.003 to 1000 hours. A treatment at 100° C. requires 1 hour and lower temperatures require substantially greater time. This high temperature, long duration treatment does provide a silver oxide electrode containing divalent silver oxide having a monovalent silver oxide potential during discharge.

German Pat. No. 1,496,361, issued to Yardney International Corp., also discloses a process for treating silver oxide electrodes containing divalent silver oxide for the purpose of providing alkaline batteries having a single voltage plateau during discharge. The process disclosed in the German patent comprises treating the silver oxide electrode with an aqueous silver nitrate solution to deposit a thin film of silver nitrate on the surface. Upon subsequent contact with alkaline electrolyte, a layer of monovalent silver oxide is formed on the surface of the electrode. The treatment with the silver nitrate solution requires up to an hour, with 5 to 10 minutes being sufficient if the solution is heated.

SUMMARY OF THE INVENTION

It is the general object of this invention to provide a primary alkaline cell having a stable divalent silver oxide depolarizer mix which is stable in alkaline electrolyte and which can be discharged at a single voltage plateau. Another object of the invention is to provide a divalent silver oxide depolarizer mix treated with a mild reducing solution to form a reduced layer surrounding the mix and coated with a layer of silver on the surface of the reduced layer adjacent to the separator whereby the divalent silver oxide is discharged at the monovalent silver oxide voltage. A further object is to provide a primary alkaline cell with a divalent silver oxide depolarizer mix having improved gassing stability in alkaline electrolyte and improved voltage stability during discharge at the monovalent silver oxide voltage.

It has been discovered that a primary alkaline cell with a stable divalent silver oxide depolarizer mix can be prepared by treating the mix with a mild reducing solution to form a reduced layer surrounding the mix followed by a treatment with a strong reducing solution to form a substantially continuous and electrolyte permeable layer of silver on the surface of the depolarizer mix adjacent to the separator. The depolarizer mix is used in primary alkaline cells having a zinc negative electrode with the silver layer adjacent to the separator, and these cells can be discharged at a single voltage plateau with a maximum open circuit voltage of about 1.75 volts. It has been found that substantially greater amounts of divalent silver oxide can be incorporated in the depolarizer mix, amounts ranging from about 50% to about 100% by weight of AgO based on the total silver oxide content, and still achieve a single voltage plateau discharge if the mix is treated with a mild reducing solution prior to forming the silver layer.

The preferred method for stabilizing the depolarizer mix comprises (1) forming a depolarizer mix containing divalent silver oxide, which may include monovalent silver oxide and additives for special purposes, (2) compressing the mix in a press to form a pellet, (3) treating the pellet with a mild reducing solution such as an alkaline solution of methanol and retaining the pellet in the reducing solution for several minutes to form a reduced layer surrounding the mix, (4) consolidating the pellet with the reduced layer in a cathode container by compression, and (5) treating the consolidated pellet/cathode container assembly with a strong reducing solution to form a substantially continuous and electrolyte permeable layer of silver on the surface of the depolarizer mix. If desired, the treatment of the pellet with the mild reducing solution can be performed after the pellet is consolidated in the cathode container in which case the reduced layer is formed on only the exposed surface of the mix, but it must be done before the treatment with the strong reducing solution. The pellet may also be treated with both the mild reducing solution and the strong reducing solution prior to consolidation in the cathode container. Instead of treating the depolarizer mix with a strong reducing solution to form the silver layer, it may be formed by placing a silver screen, expanded silver metal, perforated silver foil or porous layer on the surface of the reduced layer adjacent to the to the separator. It is preferred to place a metal sleeve around the upper edge of the depolarizer mix pellet, and this may be done prior to consolidating the pellet in the cathode container. It is also preferred to dry the pellet after the treatment with the mild reducing solution and before consolidation in the cathode container. The depolarizer mix may be formed by physically mixing divalent silver oxide with other ingredients including monovalent silver oxide, by oxidizing silver powder to form divalent silver oxide or a mixture thereof with monovalent silver oxide, or by partially reducing a divalent silver oxide composition, including in situ reduction by mixing with a reducing metal, e.g. cadmium and zinc.

The above and other objects and advantages of this invention will be more fully described in the description of the preferred embodiment, particularly when read in conjunction with the accompanying drawings which forms a part of this specification.

BRIEF DESCRIPTION OF THE DRAWING

FIG. 1 is a cross-sectional view of a primary alkaline cell, in completely assembled condition, having a stable divalent silver oxide depolarizer mix in accordance with this invention.

DESCRIPTION OF THE PREFERRED EMBODIMENT

This invention comprises a primary alkaline cell having a stable divalent silver oxide (AgO) depolarizer mix which is treated with a mild reducing solution to form a reduced layer surrounding the mix followed by a treatment with a strong reducing solution to form a substantially continuous and electrolyte permeable layer of silver on the surface of the reduced layer adjacent to the separator. The initial reducing solution is sufficiently mild that no substantial portion of the divalent silver oxide is reduced to silver under the treatment conditions whereby the electrochemical capacity of the depolarizer mix is not significantly reduced. It is preferred to carry out the mild reducing solution treatment with an alkaline solution of methanol, however, other mild reducing agents such as lower aliphatic alcohols having up to 8 carbon atoms (e.g. ethanol and propanol) may be used. Alternatively, it may be possible to use a very dilute solution of a relatively strong reducing agent. This treatment may be carried out at room temperature or at elevated temperatures, up to the boiling point of the solution. The treatment with the mild reducing solution generally requires soaking the depolarizer mix in the reducing solution for up to about 10 minutes. Heating the reducing solution accelerates the reaction, and shorter times can be used for the treatment. Generally, the treatment is carried out by immersing the depolarizer mix in the mild reducing solution, however, a mild reducing vapor might be used to treat the depolarizer pellet. The mild reducing solution may be agitated during the treatment which tends to accelerate the reaction. The treatment with the mild reducing solution is of such short duration that it does not form the necessary layer of silver on the depolarizer mix. The treatment is primarily intended to stabilize the divalent silver oxide component without substantially reducing the capacity of the depolarizer mix, and it also helps to prevent substantial reduction in the electrochemical capacity during treatment with the strong reducing solution.

The negative electrode may be zinc, cadmium, indium, magnesium, aluminum, titanium or manganese. It is preferred to use zinc active material which may be in the form of finely divided zinc particles, gelled or semi-gelled zinc particles, or a zinc foil. It is generally preferred that the zinc active material should be amalgamated regardless of the form which is used.

Between the depolarizer mix and the negative electrode, there is placed a separator which generally comprises both an absorbent component and a barrier material. The absorbent component may comprise a cellulosic material such as matted cotton fibers or a non-cellulosic material such as microporous polyethylene. The absorbent material holds the electrolyte (generally in contact with the negative active material), and a plurality of layers may be used. The barrier material may also comprise one or more layers for preventing the passage of metallic ions or dendrite growth from one electrode to the other. The barrier material may be any suitable semi-permeable material such as cellophane, either alone or in combination with a synthetic barrier such as polyethylene grafted with methacrylic acid. It is preferred to use a laminated barrier material which may comprise a layer of polyethylene grafted with methacrylic acid (commercially available under the trademark "Permion") sandwiched between layers of cellophane. This laminated barrier material is particularly useful in primary alkaline cells intended to be used in high drain rate applications such as electronic watches with a light emitting diode display.

The cells of this invention utilize an alkaline electrolyte consisting essentially of an aqueous solution of an alkali metal hydroxide such as potassium hydroxide or sodium hydroxide. Other alkali metal hydroxides may also be used. The electrolyte is preferably limited to an amount sufficient only to provide wetting of the cell components without establishing a liquid level of free electrolyte in the cell. The alkaline electrolyte preferably has an alkali metal hydroxide concentration of at least about 3% by weight ranging up to about 50% by weight. It may contain minor amounts of additives such as zinc oxide to inhibit dissolution of the zinc negative active material and gassing suppressants such as gold hydroxide. Other alkali metal hydroxides, e.g. cesium, lithium or rubidium, may be substituted for minor portions of the preferred potassium hydroxide and sodium hydroxide electrolyte salts.

An important feature of this invention is the formation of a substantially continuous and electrolyte permeable layer of silver on the surface of the reduced layer adjacent to the separator by treating it with a strong reducing solution. The strong reducing solution must be sufficiently strong to reduce divalent silver oxide to silver metal under the treatment conditions, and examples of strong reducing agents which may be used are hydrazine, formaldehyde, tin chloride, iron sulfate, sulfurous acid, pyrogallol, oxalic acid, formic acid, ascorbic acid, tartaric acid and hydroxylamine. A methanol solution of hydrazine is preferred. The treatment with the strong reducing solution may require up to about 10 minutes, with from about 2-6 minutes being preferred, however, excessive treatment with the strong reducing solution can substantially reduce the capacity of the depolarizer mix. The treatment with the strong reducing solution is usually performed at room temperature, however, elevated temperatures may be used especially if it is desired to accelerate the reduction. A high proportion of AgO may require a longer treatment or treatment at elevated temperature. Instead of forming a substantially continuous layer of silver, a less preferred embodiment employs a silver layer formed by placing a silver screen, expanded silver metal, perforated silver foil or porous silver powder layer on top of the reduced layer adjacent to the separator.

Depolarizer mixtures containing from about 50% to about 100% by weight of divalent silver oxide require both the reduced layer and the layer of silver adjacent to the separator for improved stability and improved electrical performance, particularly flash current to provide pulse discharges. Both the reduced layer and the layer of silver adjacent to the separator are required to provide a single voltage plateau discharge with a maximum open circuit voltage of about 1.75 volts when the preferred depolarizer mix containing at least about 50% by weight of AgO is used.

The divalent silver oxide mix may be formed by (1) physical mixing, (2) oxidizing silver or $Ag_2O$ powder, or (3) partially reducing a divalent silver oxide composition. The mix may also contain additives for special purposes such as polytetrafluoroethylene to function as a lubricant and a binder, silver powder as a stabilizer and gold hydroxide as a gassing suppressant. The ingredients may be mixed in a blender to form a homogeneous depolarizer mix which is then compressed in a press to form a pellet using a pressure ranging from about 40,000 to 60,000 psi. It is preferred to treat the pellet with a mild reducing solution by immersing it in the solution of a reducing agent (e.g. methanol) for several minutes. The pellet is dried and consolidated in a cathode container by compression using a consolidation pressure ranging from about 50,000 to about 70,000 psi. The treatment with the mild reducing solution to form the reduced layer can be deferred until after the pellet is consolidated in the container, however, this is not as effective because access to the divalent silver oxide is restricted. Since the substantially continuous and electrolyte permeable silver layer which is formed by treatment with a strong reducing solution is required only on the surface of the reduced layer adjacent to the separator, it is preferred to carry out the strong reducing treatment after the pellet is consolidated in the cathode container. Furthermore, since access to the divalent silver oxide is restricted by the container, this may also help to prevent substantial reduction in the capacity of the depolarizer mix. If desired, the treatment with the strong reducing solution can be performed prior to consolidation of the pellet in the can, however, the strong reducing treatment always follows the mild reducing treatment. It is preferred to place a metal sleeve around the upper edge of the depolarizer mix to protect it during the consolidation of the pellet in the cathode container and during the final sealing operation when the anode and cathode containers are assembled.

One of the objectives of this invention is to increase the energy density per unit weight or volume of the depolarizer mix and still achieve a single voltage plateau discharge and adequate stability in alkaline electrolyte. Maximum energy density is achieved by using only divalent silver oxide depolarizer material. It has been found that the depolarizer mix can contain as much as about 100% by weight of divalent silver oxide based on the total silver oxide content and still provide an alkaline cell having acceptable stability and a single voltage plateau.

Referring now to FIG. 1, a "button" cell construction 10 is illustrated, for the primary alkaline cell of this invention is particularly adapted for use in this construction, and button cells were used to evaluate the divalent silver oxide depolarizer mixtures. These button cells are of the type currently used as a power source for electric and electronic watches, an application for which the primary alkaline cells having a reduced layer surrounding the divalent silver oxide depolarizer mix and a layer of silver on the surface of the reduced layer adjacent to the separator are particularly effective.

The negative electrode (anode) container 11 comprises what is commonly referred to as a "double top". Two cans are placed in physical, electrical contact with each other, with the inner can 12 being nested in the outer can 13 to form a tight friction fit. It is generally preferred to spot weld the cans together as indicated at 14 to maintain permanent electrical contact. The cans may be made from nickel-plated steel which has good corrosion resistance, however, other materials may be used and the surfaces of the cans can be given special coatings. The "double top" anode container is preferred for its superior leakage prevention properties, however, a single top container can be used. A collar or grommet 15 of nylon or polyethylene is molded onto the edge of the anode container 11 to electrically insulate it from the depolarizer (cathode) container 16. The negative electrode or anode 17 is a zinc active material in the form of a gel or semi-gel comprising finely divided zinc particles, a small amount of gelling agent such as guar gum or carboxymethyl cellulose (e.g. 0.2% by weight) and a portion of the aqueous alkaline electrolyte solution.

The separator comprises an absorbent component 18 and a barrier material 19. It is preferred to use matted cotton fibers (commercially available under the trademark "Webril") as the absorbent component which also contains a portion of the alkaline electrolyte. The semi-permeable barrier material comprises a layer 20 of polyethylene grafted with methacrylic acid (commercially available under the trademark "Permion") sandwiched between layers 21 of cellophane. The absorbent component 18 is placed in contact with the zinc active material, and the barrier material is in contact with the silver layer 22 on the surface of the depolarizer mix 23 which is completely coated with a reduced layer 24 formed by treating the mix 23 with a mild reducing solution prior to consolidating the mix 23 in the cathode container 16.

The depolarizer mix or cathode 23 comprises a mixture containing divalent silver oxide (AgO). The depolarizer mix may also contain monovalent silver oxide, generally contains polytetrafluoroethylene (commercially available under the trademark "Teflon") as a binder and lubricant, and silver powder for voltage stability. The mix may also contain a minor amount of a gas suppressant such as gold hydroxide to insure the stability of the divalent silver oxide in the alkaline electrolyte.

The silver layer 22 is substantially continuous and electrolyte permeable. It is formed in situ on the depolarizer mix after it is treated with a mild reducing solution (alkaline solution of 10% methanol) to form reduced layer 24 and after it is consolidated in the cathode container 16, by immersing it in a strong reducing solution such as a 3% by weight hydrazine solution in methanol for about 5 minutes. A metal sleeve 25 is placed around the upper edge of the depolarizer mix, however, this is not an essential component of the button cell construction. The depolarizer mix 23 may comprise divalent silver oxide (AgO) which has a gray color and monovalent silver oxide ($Ag_2O$) which is deep purple to black in color. The reduced layer 24 ranges from dark brown to black and the silver layer 22 has a metallic silver color. Though not preferred, the silver layer 22 may comprise a silver screen, expanded silver metal, perforated silver foil or a porous silver powder layer placed on top of the reduced layer 24 and preferably under and in contact with the metal sleeve 25.

The primary alkaline cells of this invention are specially designed and constructed as power sources for electric and electronic watches. The electronic watches which have a light emitting diode (LED) display require a battery which is capable of providing a high drain rate discharge in the form of pulses. It is essential in order to light the display for a reasonable number of pulses that the primary alkaline cells be capable of providing a flash current greater than an average of 0.2 amperes per square centimeter of cell cross-sectional area. Some of the primary cells of this invention have this capability, particularly those which use a potassium hydroxide electrolyte. In some cases it may be necessary to precondition the cell before using it as a power source by short circuiting the cell for a few seconds. It has been discovered that this preconditioning increases the flash current of the cell and provides more uniform flash current performance.

EXAMPLE 1

Primary cells having divalent silver oxide (AgO) depolarizer mixtures with AgO contents ranging from 50% by weight to 90% by weight were tested for electrical properties and stability. Depolarizer mixtures treated with both a mild reducing solution to form the reduced layer and a strong reducing solution to form the substantially continuous silver layer were compared to mixtures treated with only the strong reducing solution to form the silver layer. The mild reducing solution treatment comprised soaking the depolarizer mix pellets (prior to consolidation) for 1 minute at room temperature in a 90/10 solution of 30% aqueous KOH/methanol, followed by rinsing in distilled water, then tap water, and drying in hot air (about 50° C). The strong reducing solution treatment was performed after consolidating the pellets in the cathode container and comprised soaking the consolidations in a solution of 1% by weight hydrazine in methanol, with stirring, for 3 minutes at room temperature.

All of the cells (RW 44 size with a 0.450 inch cathode container diameter and a height ranging from 0.150 – 0.162 inches) used a 40% KOH + 1%ZnO electrolyte solution and had a construction as illustrated in FIG. 1, with a zinc gel anode and a separator comprising an absorbent (Webril) and a barrier material of polyethylene grafted with methacrylic acid between layers of cellophane. The depolarizer mix comprised the indicated percentage of AgO, 1.5% by weight of polytetrafluoroethylene (Teflon) lubricant and binder, and the balance was $Ag_2O$. The cells were tested for stability by measuring the change in space between the anode (top) and cathode (bottom) with a micrometer after storage at 71° C. for 7 days. The flash current was measured by electrically connecting a cell to a standard ammeter (having an internal resistance of about 0.015 ohms) and determining the current flow at 0.5 seconds. The following results were recorded, with all electrical readings being the average of 35–40 cells and the cell expansion data being the average of 4 cells.

| % AgO | Treatment | OCV | CCV (167 ohm) | Impedance (ohms) | Flash Current (amps) | Cell Expansion (mils) |
|---|---|---|---|---|---|---|
| 50 | Methanol/Hydrazine | 1.61 | 1.56 | 2.7 | 0.66 | 7 |
| 50 | Hydrazine | 1.61 | 1.54 | 13.8 | 0.63 | 7 |
| 60 | Methanol/Hydrazine | 1.61 | 1.54 | 8.4 | 0.61 | 7 |
| 60 | Hydrazine | 1.62 | 1.47 | 74.0 | 0.59 | 6 |
| 70 | Methanol Hydrazine | 1.61 | 1.53 | 40.1 | 0.64 | 6 |
| 70 | Hydrazine | 1.84 | 1.46 | 100+ | 0.68 | 14 |
| 80 | Methanol/Hydrazine | 1.71 | 1.50 | 99.9 | 0.62 | 17 |
| 80 | Hydrazine | 1.85 | 1.50 | — | 0.63 | 16 |
| 90 | Methanol/Hydrazine | 1.85 | 1.50 | — | 0.61 | 16 |
| 90 | Hydrazine | 1.86 | 1.48 | 48.7 | 0.56 | 20 |

All of the cells up to and including 80% AgO which had both a reduced layer and a silver layer had monovalent silver oxide open circuit voltages (about 1.75v. and below). Depolarizers containing at least 70% AgO which had only a silver layer had the divalent silver oxide open circuit voltage. The depolarizer mixtures containing 90% AgO with both a reduced layer and a silver layer also had a divalent silver oxide open circuit voltage.

EXAMPLE 2

Primary alkaline cells identical in size and construction to those in Example 1 were subjected to treatment with both methanol (mild reducing solution) to form the reduced layer and hydrazine (strong reducing solution) to form the silver layer and compared to cells treated only with hydrazine to form the silver layer. The methanol treatment was carried out in 90/10 30% aqueous KOH/methanol solution for 1 minute, with some cells treated at room temperature and other cells at 80° C. All of the depolarizer mixtures contained 90% by weight AgO, 8.5% $Ag_2O$ and 1.5% polytetrafluoroethylene. The following results were recorded, with each electrical measurement being the average of 35–40 cells and cell expansion data being the average of 4 cells.

| Pellet Treatment | OCV | CCV (167 ohm) | Impedance (ohms) | Flash Current (amps) | Cell Expansion (mils) 7 days at 71° C |
|---|---|---|---|---|---|
| Methanol at RT | 1.85 | 1.50 | — | 0.61 | 16 |
| None | 1.86 | 1.48 | 48.7 | 0.56 | 20 |
| Methanol at 80° C | 1.63 | 1.53 | 9.0 | 0.8 | 7 |
| None | 1.85 | 1.51 | 50.0 | 0.30 | 15 |

Only the depolarizer mix treated with methanol at 80° C to form the reduced layer had a monovalent silver oxide open circuit voltage, and it also had superior impedance, flash current and stability.

EXAMPLE 3

Primary alkaline cells (RW 44 size) having the construction illustrated in FIG. 1 with depolarizer mixes varying from 50% AgO to 95% AgO were evaluated to determine the effect of varying the duration of the methanol and hydrazine treatments. The methanol treatment comprised soaking the depolarizer pellets (prior to consolidation in the cathode container) for the indicated time in a 90/10 solution of 30% aqueous KOH/methanol, followed by rinsing in distilled water, tap water and drying in hot air (about 50° C.). The hydrazine treatment consisted of soaking depolarizer pellets consolidated in the cathode container in a solution of 1% by weight hydrazine in methanol, with stirring, for the indicated time. All reducing solution treatments were at room temperature. The anode was zinc gel and the electrolyte was an aqueous solution of 40% KOH + 1% ZnO.

The "AgO mix" consisted of 95.2% AgO, 3.0% silver powder, 1.5% polytetrafluoroethylene and 0.3% gold hydrozide $Au(OH)_2$. The following depolarizer mixtures were tested:

| Mix | Composition |
|---|---|
| A | 50% AgO mix, 49% $Ag_2O$, 1% Teflon powder |
| B | 70% AgO mix, 30% $Ag_2O$ |
| C | 80% AgO mix, 20% $Ag_2O$ |
| D | 100% AgO mix |

The mix sleeve was gold plated steel. The following results were recorded, with each electrical value being the average of 30–35 cells and cell expansion data was the average of 4 cells:

| Mix | Methanol Time (Min.) | Hydrazine Time (Min.) | OCV | CCV (167 ohm) | Impedance (ohm) | Flash Current (amp) | Cell Expansion 2 wks. 71° C (mils) |
|---|---|---|---|---|---|---|---|
| A | 1 | 3 | 1.61 | 1.56 | 2.1 | 0.75 | 1.5 |
| B | 1 | 3 | 1.64 | 1.53 | 19.7 | 0.73 | 0.8 |
| B | 5 | 3 | 1.61 | 1.57 | 2.2 | 0.76 | 1.3 |
| B | 10 | 3 | 1.61 | 1.57 | 2.1 | 0.77 | 1.8 |
| B | 1 | 10 | 1.61 | 1.56 | 2.3 | 0.79 | 1.5 |
| B | 5 | 10 | 1.61 | 1.57 | 2.0 | 0.76 | 2.0 |
| B | 10 | 10 | 1.60 | 1.57 | 2.0 | 0.77 | 0.8 |
| C | 5 | 3 | 1.61 | 1.56 | 2.5 | 0.79 | 1.5 |
| C | 10 | 3 | 1.61 | 1.56 | 2.3 | 0.79 | 2.5 |
| C | 1 | 10 | 1.61 | 1.56 | 2.6 | 0.79 | 1.8 |
| C | 5 | 10 | 1.61 | 1.57 | 2.2 | 0.74 | 2.0 |
| C | 10 | 10 | 1.61 | 1.57 | 2.2 | 0.73 | 1.5 |
| D | 5 | 3 | 1.86 | 1.51 | 50.4 | 0.76 | 2.8 |
| D | 10 | 3 | 1.78 | 1.50 | 51.8 | 0.75 | 3.5 |
| D | 1 | 10 | 1.86 | 1.51 | 56.7 | 0.74 | 3.8 |
| D | 5 | 10 | 1.83 | 1.50 | 53.1 | 0.74 | 4.0 |
| D | 10 | 10 | 1.65 | 1.53 | 20.0 | 0.78 | 2.8 |

All cells were acceptable except those having 95% AgO, and increasing the methanol and hydrazine treatment time to 10 minutes reduced the OCV to 1.65 for the 95% AgO mix.

EXAMPLE 4

Treatment of the depolarizer pellet with both mild and strong reducing solutions after it was consolidated in the cathode container whereby the reduced layer was only on the top surface of the depolarizer and did not surround it was evaluated for two depolarizer mixtures. The hydrazine treatment to form the substantially continuous and electrolyte permeable silver layer was in a solution of 1% hydrazine in methanol for 3 minutes at room temperature. The methanol treatment to form the reduced layer comprised immersing the consolidations in a 90/10 solution of 30% aqueous KOH/methanol at room temperature for the indicated time. The "AgO mix" composition was the same as in Example 3, the metal sleeve in all cells was silver plated, and the following depolarizers were tested:

| Mix | Composition |
|---|---|
| A | 50% AgO mix, 49% Ag$_2$O, 1% Teflon |
| B | 100% AgO mix |

The following results were recorded, with each electrical value being the average of 40 cells and cell expansion data was the average of 4 cells.

| Mix | Pellet Treatment | Consolidation Treatment | OCV | CCV (167 ohm) | Impedance (ohm) | Flash Current (amp) | Cell Expansion 1 wk at 71°C (mils) |
|---|---|---|---|---|---|---|---|
| A | Methanol-1 min. | Hydrazine | 1.62 | 1.55 | 2.3 | 0.76 | 2.7 |
| A | None | Methanol-5 min. & Hydrazine | 1.61 | 1.57 | 2 | 0.81 | 4.0 |
| A | None | Methanol-15 min. & Hydrazine | 1.61 | 1.57 | 2 | 0.82 | 3.3 |
| A | None | Methanol-60 min. & Hydrazine | 1.61 | 1.57 | 2 | 0.79 | 5.0 |
| B | None | Methanol-5 min. & Hydrazine | 1.86 | 1.51 | 60 | 0.70 | 10.7 |
| B | None | Methanol-15 min. & Hydrazine | 1.87 | 1.51 | 64 | 0.71 | 10.7 |
| B | None | Methanol-60 min. & Hydrazine | 1.86 | 1.52 | 58 | 0.74 | 9.3 |

The methanol and hydrazine treatment of the mix after consolidation in the container was effective for the depolarizer containing about 50% AgO, however, the cell with the 100% AgO depolarizer mix had the OCV characteristic of a two voltage plateau discharge, its impedance was high, and the stability was not acceptable.

EXAMPLE 5

The effect of methanol treatment and hydrazine treatment on cell capacity (RW 44 size) was determined for various depolarizer mixtures and treatment times. In all cases, the hydrazine and methanol treatments were the same as those used in Example 1, with all reducing agent treatments carried out at room temperature. The AgO mix was the same as in Example 3. The following depolarizers were evaluated:

| Mix | Composition |
|---|---|
| A | 70% AgO mix, 30% Ag$_2$O |
| B | 80% AgO mix, 20% Ag$_2$O |
| C | 95.2% AgO mix, 3% Ag, 1.5% Teflon, 0.3% Au(OH)$_2$ |
| D | 50% AgO mix, 49% Ag$_2$O, 1% Teflon powder |

The following results were recorded, with each value representing the average of 3 depolarizer pellets:

| Mix | Capacity Untreated Pellet mAH/g | mAH | Methanol Treatment Time (min.) | Post Methanol Capacity mAH/g | mAH | Hydrazine Treatment Time (min.) | Post Hydrazine Capacity mAH mAH/g | |
|---|---|---|---|---|---|---|---|---|
| A | 359 | 220 | 1 | 357 | 221 | 3 | 208 | 335 |
| A | " | " | 5 | 349 | 212 | 3 | 208 | 335 |
| A | " | " | 10 | 345 | 214 | 3 | 196 | 316 |
| A | " | " | 1 | 357 | 221 | 10 | 194 | 313 |
| A | " | " | 5 | 349 | 212 | 10 | 197 | 317 |
| A | " | " | 10 | 345 | 214 | 10 | 197 | 317 |
| B | 376 | 233 | 5 | 367 | 228 | 3 | 208 | 335 |
| B | " | " | 10 | 360 | 220 | 3 | 207 | 334 |
| B | " | " | 1 | 375 | 239 | 10 | 208 | 335 |
| B | " | " | 5 | 367 | 228 | 10 | 203 | 327 |
| B | " | " | 10 | 360 | 220 | 10 | 209 | 337 |
| C | 412 | 256 | 5 | 403 | 246 | 3 | 229 | 369 |
| C | " | " | 10 | 394 | 240 | 3 | 225 | 363 |
| C | " | " | 1 | 409 | 245 | 10 | 223 | 359 |
| C | " | " | 5 | 403 | 246 | 10 | 220 | 355 |
| C | " | " | 10 | 394 | 240 | 10 | 212 | 342 |
| D | 329 | 204 | 1 | 317 | 200 | 3 | 187 | 302 |

All of these cells had acceptable stability during elevated temperature storage.

EXAMPLE 6

The effect of treating depolarizer mixtures with a mild reducing solution comprising an alkaline ethanol solution and an alkaline n-propanol solution was determined for mixtures containing 60% by weight AgO and 36.85% by weight of Ag$_2$O. All treatments with the mild reducing solution were performed by immersing the compressed pellet (not consolidated in the container) in the mild reducing solution for 5 minutes. Some of the pellet treatments were at room temperature (RT) and 60° C. After the treatment, the pellets were rinsed in distilled water, soaked in 30% KOH solution for 24 hours at room temperature, rinsed in tap and distilled water, and dried in hot air (about 50° C.) for about 10 minutes. Untreated pellets and pellets soaked in 30% KOH were used as standards. Some of the pellets were used to make 15 RW 44 cells using a 40% KOH electrolyte containing 1% ZnO. Prior to assembly of the cells, the pellets were consolidated in the cathode container and treated with a strong reducing solution consisting of 1% by weight hydrazine in methanol for 3 minutes. The following results were recorded:

| Reducing Solution | Temp. | Soak in 30% KOH | Pellet Capacity mAH/g | Impedance (ohms) | Average OCV | CCV | Flash Current (amps) |
|---|---|---|---|---|---|---|---|
| None | | No | 338 | 44.0 | 1.77 | 1.52 | 0.56 |
| 30% KOH | 80° C. | Yes | 345 | 44.8 | 1.75 | 1.52 | 0.55 |
| 20% Ethanol in 30% KOH | RT | Yes | 339 | 5.9 | 1.62 | 1.54 | 0.58 |
| 20% Ethanol in 30% KOH | 60° C. | Yes | 330 | 3.8 | 1.62 | 1.55 | 0.58 |
| 40% Propanol in 30% KOH | RT | Yes | 340 | 4.9 | 1.62 | 1.55 | 0.61 |
| 40% Propanol in 30% KOH | 60° C. | Yes | 338 | 11.2 | 1.62 | 1.54 | 0.61 |

The ethanol and n-propanol treatments reduced the OCV to 1.62, and impedance, flash current and CCV were also improved.

EXAMPLE 7

The effect of treating depolarizer mixtures with a mild reducing solution containing tartaric acid was determined with both aqueous solutions and 30% KOH solutions containing 20% by weight of tartaric acid. Treatment times and temperatures were varied. All depolarizer mixtures contained 60% by weight AgO and 36.85% by weight of $Ag_2O$. All treatments with the mild reducing solution were performed by immersing the compressed pellet (not consolidated in the container) in the mild reducing solution. After the treatment, the pellets were rinsed in water, soaked in 30% KOH solution for 24 hours at room temperature, then rinsed in water and dried in hot air (about 50° C.) for about 10 minutes. Some of the pellets were used to make 4–10 RW 44 cells using a 40% KOH electrolyte containing 1% ZnO. Prior to assembly of the cells, the pellets were consolidated in the cathode container and treated with a strong reducing solution consisting of 1% by weight hydrazine in methanol for 3 minutes. Untreated pellets and pellets soaked in 30% KOH were used as standards. The following results were recorded:

by weight polytetrafluoroethylene, and 0.5% by weight CdO. The depolarizer mix was compressed into a pellet and then treated for 10 minutes in a 10% by weight methanol in a 30% by weight potassium hydroxide solution at 80° C. to form a reduced layer. The depolarizer mix surrounded by the reduced layer was placed in a cathode container and an expanded silver metal blanked out in the shape of a disc with a 0.43 inch diameter was placed on top of the reduced layer. The expanded silver metal had diamond shaped openings comprising about 28% of the surface area and a thickness of about 23 mils. After the expanded silver metal disc was in place on the reduced layer in the cathode container, a metal sleeve was placed around the upper edge of the depolarizer mix and on top of the expanded silver metal disc. The expanded silver metal was consolidated on the surface of the reduced layer surrounding the depolarizer mix and under the metal sleeve. The anode was a zinc gel comprising 99.8% by weight amalgamated zinc particles and 0.2% by weight guar gum. The electrolyte was a 40% potassium hydroxide aqueous solution containing 1% by weight zinc oxide. The following data which represent the average of 30 cells were recorded:

| Initial OCV | After 3 Days Storage at Room Temperature | | | |
|---|---|---|---|---|
| | Impedance | OCV | CCV (167 ohms) | Flash Current |
| 1.87 v. | 28.6 ohms | 1.73v. | 1.39 v. | 0.56 amps |

| Reducing Solution | Temp. | Time | Soak in 30% KOH | Pellet Capacity mAH/g | Impedance (ohms) | Average OCV | CCV | Flash Current (amps) |
|---|---|---|---|---|---|---|---|---|
| None | | | Yes | 343 | 47.0 | 1.74 | 1.52 | 0.58 |
| 30% KOH | 80° C. | 5 min. | Yes | 345 | 44.8 | 1.75 | 1.52 | 0.55 |
| 20% Tart./$H_2O$ | 60° C | 5 min. | Yes | 336 | 39.9 | 1.62 | 1.53 | 0.57 |
| 20% Tart./KOH | 80° C | 5 min. | Yes | 198 | 58.1 | 1.62 | 1.52 | 0.17 |
| 20% Tart./KOH | RT | 1 min. | Yes | 337 | 51.3 | 1.63 | 1.52 | 0.56 |

The treatment with the tartaric acid solution lowered the OCV to 1.62 v. and the aqueous solution treatment also improved the impedance. However, the alkaline solution at 80° C for 5 minutes was too strong for the capacity was substantially reduced, the impedance was increased and the flash current was significantly lower.

EXAMPLE 8

Primary alkaline cells (RW 44 size) having a construction similar to the cell illustrated in FIG. 1 were tested to determine the effect of using an expanded silver metal as the silver layer on the reduced surface of the depolarizer mix adjacent to the separator. The depolarizer mix contained 98% by weight AgO, 1.5%

| Day 4 OCV | After 6 Days Storage at Room Temperature | | | |
|---|---|---|---|---|
| | Impedance | OCV | CCV(167 ohms) | Flash Current |
| 1.62v. | 30.8 ohms | 1.72v. | 1.35 v. | 0.62 amps |

The cells had an OCV of 1.87 v. one hour after closing which is characteristic of the divalent silver oxide. However, 3 days later the OCV dropped to 1.73 v. which is within the scope of this invention. On day 4, the cells were given a 1 second short circuit and 10 minutes later had an OCV of 1.62 v. which is characteristic of monovalent silver oxide. After 6 days, the OCV was 1.72 v. and this is within the scope of this invention. The expanded silver metal was not as effective as the substantially continuous and electrolyte permeable layer of silver, however, it is an improvement over cells having no silver layer whose OCV remains at the 1.85 – 1.88 v. level for weeks.

Having completely described my invention, I claim:

1. A primary alkaline cell comprising a negative electrode, a divalent silver oxide depolarizer mix containing divalent silver oxide, a separator between said negative electrode and said divalent silver oxide depolarizer mix, and an aqueous alkaline electrolyte, said divalent silver oxide depolarizer mix being surrounded by a reduced layer formed by treating said depolarizer mix with a mild reducing solution, and a layer of silver on the surface of the reduced layer adjacent to the separator, whereby the cell is characterized by the stability of the depolarizer mix in the alkaline electrolyte, a maximum open circuit voltage of about 1.75 volts and a single voltage plateau during discharge.

2. A primary alkaline cell in accordance with claim 1 in which the silver layer is substantially continuous and electrolyte permeable having been formed by treating the depolarizer mix with the reduced layer with a strong reducing agent capable of reducing the reduced layer to metallic silver.

3. A primary alkaline cell in accordance with claim 1 in which the depolarizer mix contains at least about 50% by weight of divalent silver oxide.

4. A primary alkaline cell in accordance with claim 2 in which the silver layer is only on the surface of the reduced layer adjacent to the separator having been formed by treating the depolarizer mix with the reduced layer after it is placed in a cathode container.

5. A primary alkaline cell in accordance with claim 2 in which the depolarizer mix contains at least about 50% by weight of divalent silver oxide.

6. A primary alkaline cell in accordance with claim 4 in which the alkaline electrolyte is an aqueous solution of potassium hydroxide having a concentration ranging from at least about 3% by weight up to about 50% by weight of potassium hydroxide.

7. A primary alkaline cell in accordance with claim 5 in which the alkaline electrolyte is an aqueous solution of potassium hydroxide having a concentration ranging from at least about 3% by weight up to about 50% by weight of potassium hydroxide.

8. A primary alkaline cell comprising a negative electrode, a divalent silver oxide depolarizer mix containing divalent silver oxide, a separator between said negative electrode and said divalent silver oxide depolarizer mix, and an aqueous alkaline electrolyte, said divalent silver oxide depolarizer mix having a reduced layer on its top surface near the separator formed by treating the depolarizer mix with a mild reducing solution after it is placed in a cathode container, and a layer of silver on the surface of the reduced layer adjacent to the separator, whereby the cell is characterized by the stability of the depolarizer mix in the alkaline electrolyte, a maximum open circuit voltage of about 1.75 volts and a single voltage plateau during discharge.

9. A primary alkaline cell in accordance with claim 8 in which the silver layer is substantially continuous and electrolyte permeable having been formed by treating the depolarizer mix with the reduced layer with a strong reducing agent capable of reducing the reduced layer to metallic silver.

10. A primary alkaline cell in accordance with claim 9 in which the depolarizer mix contains up to about 70% by weight of divalent silver oxide.

11. A primary alkaline cell comprising a zinc negative electrode, a divalent silver oxide depolarizer mix containing divalent silver oxide and a polymeric binder, a separator between said zinc electrode and said divalent silver oxide depolarizer mix, and an aqueous alkaline electrolyte, said divalent silver oxide depolarizer mix being surrounded by a reduced layer formed by treating said depolarizer mix with a mild reducing solution, and a layer of silver on the surface of the reduced layer adjacent to the separator, whereby the cell is characterized by the stability of the depolarizer mix in the alkaline electrolyte, a maximum open circuit voltage of about 1.75 volts and a single voltage plateau during discharge.

12. A primary alkaline cell in accordance with claim 11 in which the silver layer is substantially continuous and electrolyte permeable having been formed by treating the depolarizer mix with the reduced layer with a strong reducing agent capable of reducing the reduced layer to metallic silver.

13. A primary alkaline cell in accordance with claim 12 in which the silver layer is only on the surface of the reduced layer adjacent to the separator.

14. A primary alkaline cell in accordance with claim 13 in which the depolarizer mix contains at least about 50% by weight of divalent silver oxide.

15. A primary alkaline cell in accordance with claim 14 in which the alkaline electrolyte has a concentration ranging from about 3% by weight up to about 50% by weight.

16. A primary alkaline cell in accordance with claim 15 in which the alkaline electrolyte is an aqueous solution of potassium hydroxide.

17. A primary alkaline cell in accordance with claim 16 in which the polymeric binder is polytetrafluoroethylene and the separator comprises an absorbent component and a barrier material.

18. A primary alkaline cell in accordance with claim 17 in which the barrier material comprises a layer of polyethylene grafted with methacrylic acid between layers of cellophane.

* * * * *